April 8, 1969  R. W. CASHMAN ET AL  3,436,800

TOOL CONSTRUCTION

Filed Aug. 17, 1966

INVENTORS
ROBERT W. CASHMAN
ANTHONY WASCO, JR.
BY

ATTORNEYS

United States Patent Office 3,436,800
Patented Apr. 8, 1969

3,436,800
TOOL CONSTRUCTION
Robert W. Cashman and Anthony Wasco, Jr., Saginaw, Mich., assignors to Saginaw Machine and Tool Company, Saginaw, Mich., a corporation of Michigan
Filed Aug. 17, 1966, Ser. No. 572,952
Int. Cl. B26d 7/00; B23b 29/02
U.S. Cl. 29—97    11 Claims

ABSTRACT OF THE DISCLOSURE

The tool construction of the present invention relates to a cutting tool having a plurality of tool bits contained in a holder in a stacked relationship with the cutting edges offset such that the tool construction will cut a workpiece successively and at different levels when the tool is traversed relative to a workpiece.

---

This invention relates to a tool construction and more particularly to a tool comprising a holder for a plurality of tool bits adapted to cut a workpiece successively and at different depths as the tool is traversed relatively to the workpiece.

In the machining of workpieces it frequently is necessary to remove from a workpiece a relatively large amount of stock. It often happens that the amount of stock which must be removed is greater than that which can be removed in one pass and maintain the requisite tolerances as to size and finish. However, single pass operation is highly desirable inasmuch as it enables the saving of substantial time and reduces the cost of the parts being manufactured. Consequently, it is not unusual for machines to be equipped with inordinately large and heavy tool holders which are capable of withstanding for a limited time the forces generated by the removal of large amounts of stock, but this has at least two major disadvantages. Firstly, the useful life of a tool bit subjected to such heavy operations is extremely short, thereby resulting in the necessity of frequent replacement. Secondly, the size of the tool bit holder frequently must be such that it causes interference with other holders or with the workpiece itself.

The foregoing problems have been recognized heretofore and various attempts have been made to solve them. For example, it has been proposed to mount a plurality of tool bits in a single holder, but in all known devices of this kind separate and independent mounting means for each tool bit has had to be provided, with the result that the holders have had to be quite large in size and have been quite expensive in view of the necessity of having to provide multiple tool bit mounting and locating means. Other problems with known multiple tool bit holders include the provision of proper chip breaking facilities and the secure seating of the tool bits.

An object of this invention is to provide a multiple bit tool which overcomes the disadvantages of previously known constructions.

Another object of the invention is to provide a tool having multiple tool bits and wherein the bits may be of the so-called indexible or throw-away type.

A further object of the invention is to provide a tool of the character described and wherein proper seating for each tool bit is provided automatically.

Another object of the invention is to provide a tool of the character referred to and in which at least one of the tool bits functions not only as a cutting tool, but also as a chip breaker for another tool bit.

Figure 1:
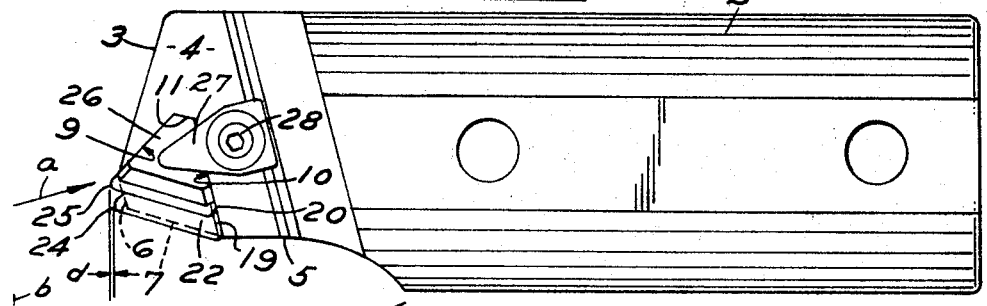
Figure 2:
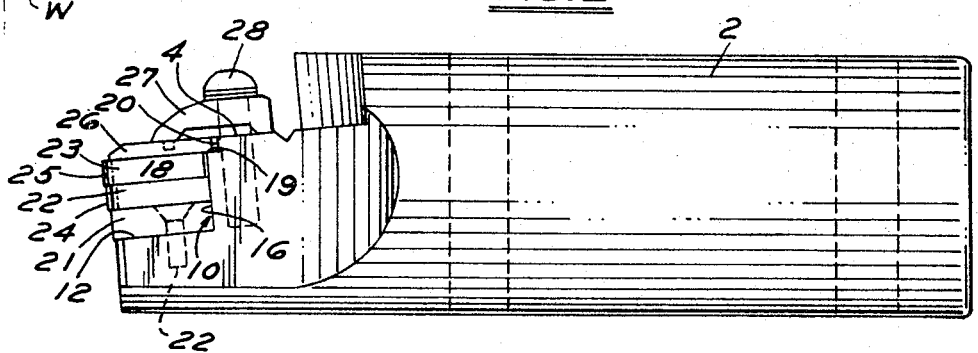
Figure 3:
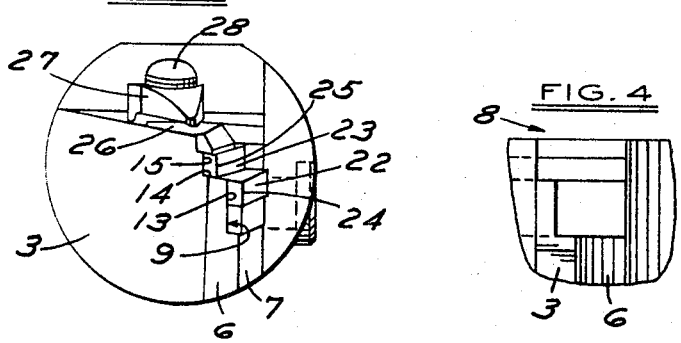
Figure 4:
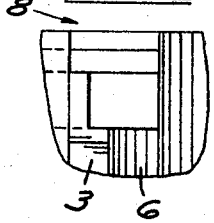

Other objects and advantages of the invention will be pointed out specifically or will become apparent from the following description when it is considered in conjunction with the appended claims and the accompanying drawings, in which:

FIGURE 1 is a top plan view of a tool constructed in accordance with the invention;
FIGURE 2 is a side elevational view of the tool;
FIGURE 3 is a front elevational view of the tool; and
FIGURE 4 is a front elevational view taken in the direction of the arrow $a$ in FIGURE 1 and with the tool bits and clamping and seating devices removed.

Apparatus constructed in accordance with the disclosed embodiment of the invention comprises a tool holder 1 having a body or shank 2 having a reduced size end portion 3 provided with a flat upper surface 4 and a flat side surface 5. The surfaces 3 and 5 merge with flat surfaces 6 and 7, respectively, which form a blunt end for the body 2.

A cavity designated generally by the reference character 8 is provided at the end 3 of the body 2. In the disclosed embodiment, the cavity 8 is substantially triangular in plan and is defined by an open side at the surface 7 from which side walls 9 and 10 converge inwardly and are joined by a short side 11. If desired, the side walls 9 and 10 could intersect each other. The recess 8 has a flat bottom surface 12 which is normal to the planes of the walls 9 and 10 and parallels the surface 4. As is best shown in FIGURE 2, the surfaces 4 and 12 do not parallel the longitudinal axis of the body 2, but are inclined to the longitudinal axis downwardly and forwardly toward the end 3 for a purpose and in a manner presently to be explained.

The cavity wall 9 has a smooth, upstanding, planar lower portion 13 which terminates at its upper edge in a laterally stepped shoulder or surface 14 which parallels the lower surface 12. The side wall 9 also includes an upstanding, planar portion 15 which parallels the portion 13 but is non-coplanar therewith.

The side wall 10 has a lower portion 16 which is normal to the lower surface 12 and has a height corresponding to the height of the wall portions 13 and 15. If desired, the upper edge of the portion 16 may be laterally stepped to provide a shoulder 19 from which extends an upstanding terminal edge portion 20.

It is preferred that a base or support member 21 having a shape corresponding substantially to the configuration of the cavity 8 be mounted in the cavity on the lower surface 12. The member 21 should be substantially no larger in area than the area of the cavity. If desired, the base member 21 may be apertured for reception of a screw 22 which may be threaded into a correspondingly threaded opening formed in the body 2 and communicating with the cavity 8.

Mounted in the cavity 8 is a pair of preferably identical tool bits 22 and 23. In the disclosed embodiment, each of the tool bits is triangular in plan so as to present three cutting edges, and the size of each bit is such that one cutting edge projects beyond the confines of the cavity for engagement with a workpiece W. The projecting cutting edge of the bit 22 is indicated by the reference character 24 and the projecting cutting edge of the bit 23 is designated by the reference character 25.

The thickness of the bit 22 is so related to the thickness of the base member 21 and to the height of the side wall portions 13 and 16 that its upper surface is flush with the shoulder 14. The upper surface of the bit 22, therefore, forms a seat or base for the bit 23, and the engaging surfaces of the bits 22 and 23 may be ground flat so as to provide a smooth supporting surface for the upper bit. The sides of the bit 22 adjacent the wall portions 13 and 16 snugly engage the latter and the sides of the bit 23 snugly engage the wall portions 15 and 16 with the lower surface of the bit adjacent the wall 15 resting upon and being supported by the shoulder 14.

The tool bits 22 and 23 disclosed herein are of uniform size. Due to the lateral stepping of the portions 13 and 15 of the cavity wall 9, however, the cutting edges 24 and 25 of the bits are offset from one another a distance corresponding to the width of the shoulder 14, as is best shown in FIGURES 1 and 3. The bits 22 and 23, therefore, are oriented to cut about different centers. Inasmuch as the cavity base 12 is not parallel to the longitudinal axis of the body 2 and the wall 10 is inclined to that axis, the cutting edge 25 of the upper bit 23 protrudes a greater distance beyond the forward end 7 of the body 2 than does the cutting edge 24. This distance is represented by the letter *d* in FIGURE 1.

Means is provided for securing the bits in the cavity and comprises a plate 26 seated on the upper surface of the bit 23 and against which bears one end of a clamping dog 27 which is anchored to the body 2 by a screw 28. The plate 26 also functions as a chip breaker.

In the use of the disclosed apparatus, the holder 2 may be clamped to a machine tool (not shown) so as to enable the cutting edges of the bits 22 and 23 to engage a workpiece W which rotates clockwise about the axis *b* (FIGURE 1) and which moves in the direction of the arrow *c* so as to traverse the tool bits. As the workpiece approaches the tool bits, the cutting edge 24 of the bit 22 will engage the workpiece first and remove from the latter a predetermined amount of stock. The tool bit 25 will function as a chip breaker. As the workpiece W continues to move in the direction of the arrow *c*, the cutting edge 25 of the bit 23 will engage the workpiece and remove additional stock therefrom.

The amount of stock removed from the workpiece by the tool bits 22 and 23 will correspond to the predetermined total amount of stock to be removed, but neither tool bit will be required to remove the entire amount of stock. Consequently, the wear imposed on each tool bit will be substantially less than that which would be imposed upon a single tool bit used to remove the same total amount of stock. Moreover, size and finish tolerances for the workpiece may be more closely maintained.

When the cutting edges 24 and 25 of the respective bits do become worn, the bits may be indexed so as to present fresh cutting edges to the workpieces. When all of the cutting edges of the bits have become worn, they may be replaced by fresh bits.

The principles underlying the disclosed embodiment of the invention are applicable to operations other than turning of workpieces. Thus, the apparatus may be used in boring, facing and milling operations as well. It will be understood that the particular configuration of the tool holder 1 will be modified to meet the requirements of the kind of operations being performed. Thus, the inclination of the cavity base 12 with respect to the longitudinal and transverse axes of the holder will be such that the cutting angle at which the bits are supported will correspond to that calculated to produce the best results.

Although the disclosed embodiment utilizes triangular cutting bits and, consequently, a generally triangularly shaped cavity, it will be understood that bits of other shapes may be used. In such event, the shape of the cavity will correspond substantially to the shape of the bit.

The disclosed embodiment is representative of a presently preferred form of the invention, but is intended to be illustrative rather than definitive thereof. The invention is defined in the claims.

What is claimed is:

1. A cutting tool holder comprising a body terminating at one end in a cavity defined by an open side and a pair of side walls converging in a direction inwardly of said body; and means forming a base for said cavity at such depth as to enable said cavity to accommodate at least two similar, flat tool bits in face-to-face engagement, one of said side walls having a first portion normal to said base and terminating in a laterally stepped shoulder having a flat surface parallel to said base, said one of said side walls having a second portion extending parallel to said first portion and in prolongation of the latter, the other of said pair of side walls having a planer portion normal to said base and coextensive in length with the combined lengths of said first and second portions of said one of said side walls, the construction being such that the area of said cavity at the plane of said base is less than the area of said cavity at the plane of said shoulder.

2. The construction set forth in claim 1 wherein the height of said first portion of said one of said side walls from the level of said base corresponds to the thickness of a first tool bit to be supported on said base whereby a second tool bit may be supported partly by said first tool bit and partly by said shoulder.

3. The construction set forth in claim 2 wherein the height of said second portion of said one of said side walls corresponds to the thickness of the second tool bit.

4. The construction set forth in claim 1 including clamp means; and means for anchoring said clamp means to said body in overlying relation to said cavity.

5. A cutting tool comprising a body terminating at one end in a cavity defined by an open side and a pair of side walls converging inwardly of said body from said open side; means forming a flat base for said cavity; a first tool bit supported on said base and having a cutting edge extending through the open side of said cavity; and a second tool bit atop said first tool bit and having a cutting edge extending through said open side of said cavity, the confronting surfaces of said tool bits being flat, each of said tool bits having side edges in engagement with said side walls of said cavity, one of the side walls of said cavity being laterally stepped to provide a shoulder above the level of said base at a height corresponding to the height of said first tool bit whereby said second tool bit is supported on said first tool bit and on said shoulder, the other of said pair of side walls being planar for the height of both of said tool bits.

6. The apparatus set forth in claim 5 wherein the cutting edges of said tool bits are offset from one another in different planes.

7. The apparatus set forth in claim 5 wherein the cutting edge of one of said tool bits projects farther beyond said cavity than does the cutting edge of the other of said tool bits.

8. The apparatus set forth in claim 5 wherein each of the side walls of said cavity is normal to said base and wherein said base is inclined to the longitudinal axis of said body.

9. The apparatus set forth in claim 8 wherein the inclination of said base is downward and forward toward said one end of said body.

10. The apparatus set forth in claim 5 wherein said cavity is substantially triangular in plan and wherein each of said tool bits is substantially triangular in plan and of uniform size.

11. The apparatus set forth in claim 10 including clamp means for clamping said tool bits in said cavity, and anchor means carried by said body for removably securing said clamp means to said body.

References Cited

UNITED STATES PATENTS

| | | | |
|---|---|---|---|
| 180,409 | 8/1876 | Alvord | 29—97 X |
| 1,955,357 | 4/1934 | Christman | 29—97 |
| 2,556,127 | 6/1951 | Walter | 29—97 |
| 3,078,547 | 2/1963 | Sweet | 29—97 |
| 3,163,918 | 2/1966 | Emmons | 29—95 |

FOREIGN PATENTS

| | | |
|---|---|---|
| 19,607 | 10/1901 | Great Britain. |
| 370,963 | 4/1932 | Great Britain. |
| 419,318 | 12/1947 | Italy. |

HARRISON L. HINSON, *Primary Examiner.*

U.S. Cl. X.R.

77—58